Patented Jan. 11, 1938

2,105,364

UNITED STATES PATENT OFFICE 2,105,364

RESINOUS THERMOPLASTIC MATERIALS

Paul Nowak, Charlottenburg, Germany, assignor to General Electric Company, a corporation of New York No Drawing. Application April 27, 1936, Serial No. 76,700. In Germany May 8, 1935

3 Claims. (Cl. 106—22)

This invention relates to resinous thermoplastic materials, and particularly to thermoplastic materials comprising polymerized combinations of acrylic acid, or its homologues, either singly or admixed together, with or without the addition of fillers, and with or without the addition of plasticizers. Still more particularly it relates to the treatment of resinous thermoplastic materials such, for example, as those just stated by way of illustration by adding to such materials a small amount of beeswax, for the particular purpose of improving the workability of such resinous thermoplastic materials. The invention also relates to the products of such treatment.

It has already been proposed to form such resinous products as those hereinabove mentioned into ribbons, plates, tubes, or the like. It has also been proposed to use instead of lead sheaths for electric cables and lines, sheaths consisting of synthetic materials which are produced by extruding tubes made of such substances around the cable.

Since it is not possible to change the mechanical properties of such substances to the same extent by subsequent treatment, as is the case with rubber, these synthetic products must be strong and tough prior to the mixing and forming operations. Due to this fact it is much more difficult to obtain a dense structure and smooth surface during the process of forming such materials than is the case with rubber. For this reason it has already been proposed to prepare resinous substances such as those hereinabove mentioned with a considerable addition of plasticizer, for example, plasticizers of the types or kinds used in the cellulose ester industry. However, in many instances, this procedure is either not permissible or advisable, for, although the addition of plasticizer makes the mass soft and easily deformable, the mass will retain this property in an undesirable manner even after the forming process.

A primary object of this invention is therefore a method or process of treatment whereby there is effected a substantial improvement in the workability of resinous thermoplastic materials such, for example, as those comprising or consisting of polymerized combinations of acrylic acid or its homologues, either singly or admixed together, with or without the addition of fillers, and with or without the addition of plasticizers.

Another object of this invention is the obtainment of the products resulting from the method or process hereinafter described for improving the workability of the thermoplastic materials to which this invention relates.

It has been found that the workability of, for example, synthetic masses of the kinds or types hereinbefore described can be very substantially improved by the addition of a small amount of beeswax. Such a slight addition of beeswax makes it possible to extrude, or to roll into thin sheets, resinous thermoplastic masses of, for example, the kinds hereinbefore mentioned much more easily than heretofore has been possible. The mechanical properties of the molded parts obtained in this manner are practically unchanged by the above-mentioned slight addition of beeswax. Moreover, it has been found that, in the case of resinous materials of the kinds hereinbefore described, the surfaces of articles, or parts thereof, consisting of such resinous materials treated in the manner described for carrying my invention into effect are substantially improved; for example, the surfaces of such articles, or parts thereof, become smooth and shiny, or, to describe the state of the surfaces with more particularity, said surfaces are smoother and more shiny (that is, glossier) than those of a similarly worked and formed mass comprising the same starting resinous thermoplastic material (e. g., a member of a group consisting of polymerized acrylic acid, polymerized homologues thereof, and polymerized derivatives of acrylic acid and its homologues without the presence of beeswax. While the advantages of such smooth and shiny surfaces in the finished or formed mass are thoroughly appreciated by me, this improvement is secondary in importance to the advantage of the better workability which is obtained by adding to resinous substances of the kinds described the hereinbeforementioned small percentage of beeswax.

The beeswax, is added to the starting material at any optional time during the process.

A substance that is adapted to be extruded on a core, that is to say, is suitable for the production of, for example, sheaths for electric cables and conductors by means of the conventional extrusion machine, has approximately the following composition:—

| | Parts by weight |
|---|---|
| Polymerized ethyl ester of acrylic acid | 200 |
| Polyvinylacetate | 118 |
| Carbon | 195 |
| Beeswax | 5 |
| Talcum | 467 |

Obviously, various changes may be made in the details of this invention as disclosed hereinbefore without departing from the spirit of the invention or sacrificing advantages resulting from carrying it into effect.

What I claim as new and desire to secure by Letters Patent of the United States, is:—

1. The method of improving the workability of a composition consisting of a minor proportion of polymerized ethyl ester of acrylic acid and polyvinyl acetate and a major proportion of carbon and talcum which consists in mixing therewith less than one per cent by weight of the whole of beeswax.

2. A composition of matter adapted to be extruded on a core, said composition consisting of a minor proportion of polymerized ethyl ester of acrylic acid and polyvinyl acetate, a major proportion of carbon and talcum, and less than one per cent by weight of the whole of beeswax.

3. An extrudable mass having the following approximate composition:

| | Parts by weight |
|---|---|
| Polymerized ethyl ester of acrylic acid | 200 |
| Polyvinylacetate | 118 |
| Carbon | 195 |
| Talcum | 467 |
| Beeswax | 5 |

PAUL NOWAK.